June 14, 1966   G. BANSE   3,256,030
STRUCTURAL BRACKET AND METHOD OF MAKING SAME
Filed May 17, 1963
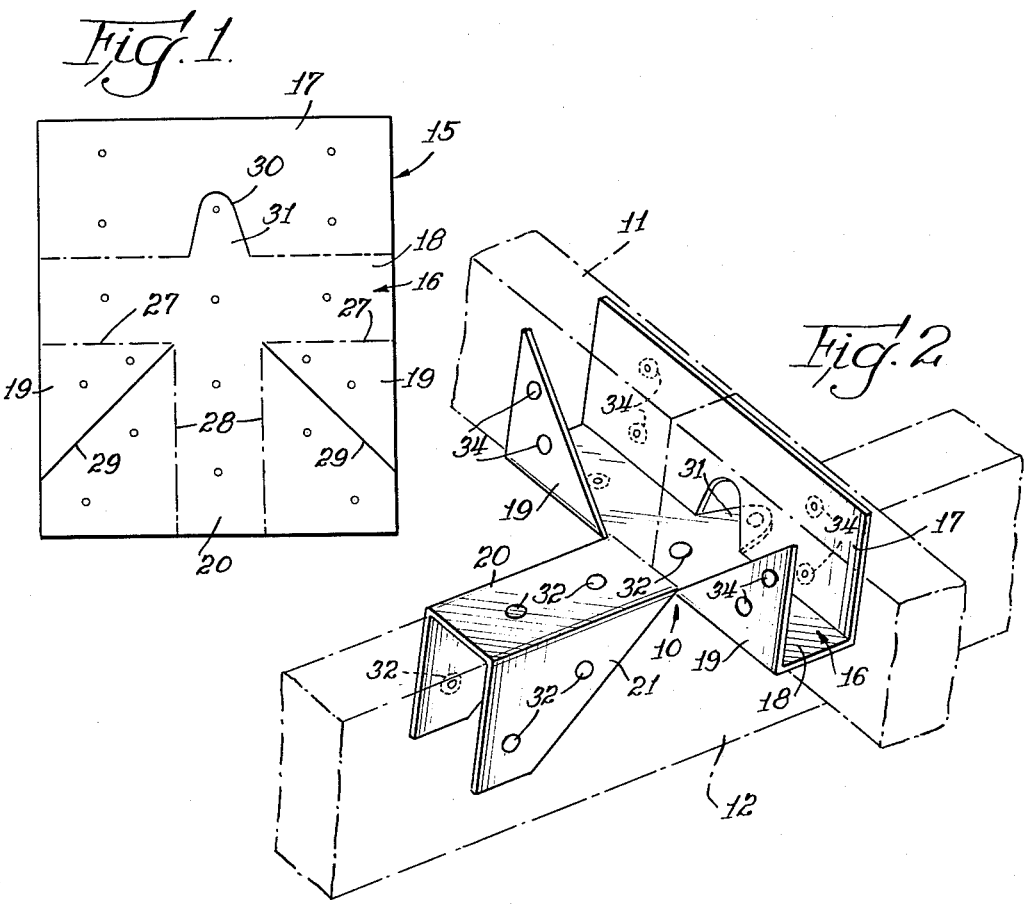
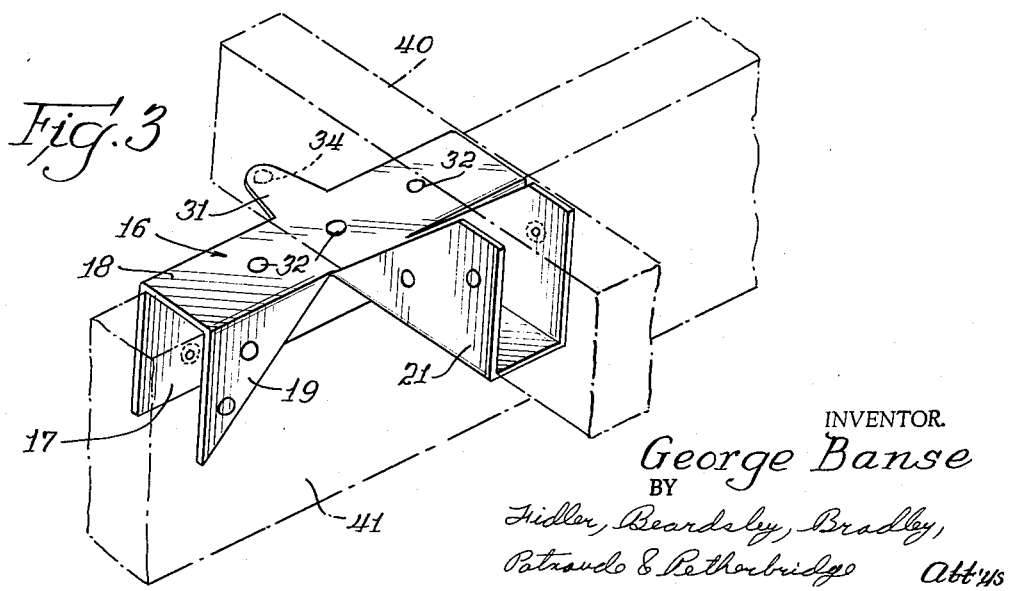
INVENTOR.
George Banse
BY Fidler, Beardsley, Bradley,
Patrouda & Petherbridge   Att'ys

United States Patent Office 3,256,030
Patented June 14, 1966

3,256,030
STRUCTURAL BRACKET AND METHOD OF MAKING SAME
George Banse, Sterling, Ill., assignor to National Manufacturing Co., Sterling, Ill., a corporation of Illinois
Filed May 17, 1963, Ser. No. 281,116
6 Claims. (Cl. 287—20.94)

This invention relates to brackets and has to do more particularly with a novel bracket for securing two structural members together in perpendicular relation.

In the construction of certain types of buildings such, for example, as pole barn buildings, purlins are customarily laid on the rafters in perpendicular, edge-to-edge relation and secured to the rafters by nails driven through both the rafters and adjacent purlins. Since the nails must be driven through the members at an angle the members are often split by the nailing operation. Moreover, where the structure is relatively long the purlins must be overlapped or spliced thus resulting in the requirement for more lumber than would be necessary if the purlins were placed in end-to-end, abutting relation. Also, where roll type or corrugated roofing is to be used with spliced purlins extra members must be employed in order to provide a member to which the roofing can be nailed.

In accordance with the present invention, a bracket is provided which has two generally channel-shaped portions offset from each other and extending perpendicularly to each other and facing in opposite directions. One of the two structural members is received in one channel and the other member is received in the other channel. The bracket is secured to the two structural members, preferably by nailing, thus securing the members in perpendicular, edge-to-edge relationship.

An object of the present invention is to provide a novel bracket for securing two structural members in predetermined relation.

Another object is to provide a bracket for securing a rectangular structural member in perpendicular relation to a second rectangular structural member.

Still another object is to provide a bracket formed from a single blank for securing two structural members in predetermined relation.

A further object is to provide a bracket which can be used to secured a purlin to an end rafter without any projection of the bracket beyond the outer face of the end rafter.

A further object is to provide a bracket whereby, two purlins can be secured to each other and to a rafter without its necessity of splicing or overlapping the purlins.

Other objects and advantages will appear from the following description taken in connection with the appended drawings wherein:

FIGURE 1 is a plan view of a blank used in forming a bracket in accordance with the invention;

FIGURE 2 is a perspective view of a bracket in accordance with the invention shown in position securing a pair of abutting purlins to a rafter, the purlins and rafter being shown in phantom; and FIGURE 3 is a perspective view of a bracket in accordance with the invention in inverted position and securing a purlin to an end rafter, the purlin and rafter being shown in phantom.

Referring now to FIG. 2, there is shown one embodiment of the invention wherein the bracket 10 is shown as securing two purlins 11—11 to a rafter 12, the purlins being disposed in end-to-end abutment. The bracket 10 is preferably formed from a plate or sheet metal blank 15 as shown in FIG. 1 and described more in detail hereinafter. The blank 15 is suitably cut and bent to form a bracket 10. The bracket 10 includes a T-shaped body portion or web 16, a flange 17 extending perpendicularly upward from the outer side edge of the crossbar portions 18 of the body portion. Upstanding from the inner side edges of the crossbar of the body portion 16 in the same direction as and spaced from and parallel to the flange 17 are a pair of triangular tongues or flanges 19. A tab 31 extends outwardly from the central portion of the outer side edge of the crossbar and lies in the plane of the body portion 16.

Extending downwardly from the side edges of the leg 20 of the body portion 16 and perpendicularly thereto are spaced, triangular tongues or flanges 21.

The bracket 10 is preferably formed from a rectangular blank 25 as seen in FIG. 1. The blank is cut along line 30 to provide a tab 31 and is bent up along a line spaced from line 27 to a position perpendicular to the remainder of the blank in order to form the flange 17. The blank is also cut along lines 29—29 and the tongues 19 are bent up along the lines 27—27 and into parallelism with the flange 17. The two tongues 21 are bent down along the lines 28—28 into perpendicular relation with the body portion 16.

The bracket is applied to the rafter 12 with the flanges 21 receiving the rafter therebetween and with the leg 20 lying flat against the edge of the rafter. The bracket 10 is secured to the rafter 12 by nails 32 extending through holes (not shown) in the leg portion 20 of the body 16 and the flanges 21. The purlins are inserted in the bracket 10 with the flange 17 and the tongues 19 receiving the purlins therebetween, with the purlins resting on the crossbar 18. The purlins are secured to the bracket by nails 34 passing through nail holes (not shown) in the flanges 17 and the flanges 19.

It will be seen that the flanges 17, cross bar 18 and tongues 19 together form, in effect, a first channel and the tongues 21 and leg 20 form, in effect, a second channel offset from and perpendicular to and extending in the opposite direction from the first flange.

It will be understood that the spacing between the flange 17 and the tongues 19 is only slightly greater than the thickness of the purlin so that the purlin seats snugly in the bracket. Similarly the spacing between the tongues 21 is only slightly greater than the thickness of the rafter so that the rafter seats snugly in the bracket.

The bracket of the present invention also may be used without alteration for securing a purlin to an end rafter in such manner that there is no projection of the bracket beyond the end rafter. Such construction is shown in FIG. 3 wherein a purlin 40 is secured to an end rafter 41 by the bracket 10. In this installation, the bracket 10 is turned upside down from the position shown in FIG. 2. The bracket 10 is placed on the rafter 41 with the flange 17 and the tongues 19 receiving the rafter 41 therebetween and with the crossbar 18 resting on the rafter. The bracket is then secured to the rafter by the nails 34 passing through holes (not shown) in the tongues 19 and the flange 17. The purlin 40 is inserted between the tongues 21 and rests on the leg 20 and the central portion of the crossbar 18. The purlin is secured to the bracket by nails 32 passing through holes (not shown) in the body portion of the bracket and the tongues 21.

When the purlin extends beyond the face of the end rafter 41 a sufficient distance, the tab 31 is secured to the purlin by a nail 34 passing therethrough and into the purlin. On the other hand, where the purlin terminates at the end face of the rafter 41 the tab 31 is bent down against the end face of the rafter 41.

It will be seen that the bracket of the present invention is a time, material, and labor saving device. The bracket can be quickly and easily placed on the rafter and nails driven through it and into the rafter and the purlin then placed in the bracket and nails driven through the bracket and into the purlin. The use of the bracket permits the nails to be driven through it and into the purlin and rafter perpendicular to the face thereof, thus avoiding splitting of the structural members. With the use of the bracket, two purlins can be installed in a straight line in end-to-end abutment thereby eliminating splicing. Thus considerable material is saved. Moreover, roofing in sheet form can be nailed to the purlins without the necessity of providing any extra member to nail the roofing to. Also, the use of the bracket permits the use of precut lumber and a precut metal roofing.

I claim:
1. A bracket for connecting two structural members in perpendicular relation, comprising
   a generally T-shaped body member having a leg portion and a cross-bar portion at one end of said leg portion and perpendicular thereto, said cross-bar portion having an outer side edge, and a pair of inner side edges parallel to said outer side edge, said leg portion having spaced side edges,
   a flange extending perpendicularly from the outer side edge of the cross-bar portion of the body member,
   a first pair of tongues extending from the inner side edges of the cross-bar portion of the body member in the same direction and parallel to said flange, and
   a second pair of tongues extending perpendicularly from the side edges of the leg portion of the body member and in the opposite direction from said first pair of tongues, and a tab extending from the outer side edge of said body member and in the plane of said body member.

2. A bracket for securing a first structural member to a second structural member disposed above said first member and extending in a direction perpendicular to said first member, comprising
   a unitary sheet metal member having a generally T-shaped body portion lying in a plane and having a leg portion and a cross-bar portion at one end of said leg portion, said body portion adapted to be disposed between said members with the leg portion thereof overlying said first member and the cross-bar portion thereof underlying said second member and partially overlying said first member, said leg portion having spaced sides, and said cross-bar portion having spaced inner and outer edges,
   a pair of side flange portions depending from the sides of said leg for overlying and engaging the vertical sides of said first member,
   another flange portion extending upwardly from the outer edge of said cross-bar for overlying and engaging one vertical side of said second member,
   another pair of flange portions extending upwardly from the inner edge of said cross-bar on opposite sides of said leg portion for overlying and engaging the other vertical side of said second member, and each of said leg, cross-bar and flange portions having at least one hole therein for receiving fastening means for securing said bracket to said first and second members.

3. A bracket as set forth in claim 2 wherein said sheet metal member is in the shape of a rectangle when said flanges are folded into the plane of said body portion.

4. A bracket as set forth in claim 2 wherein a tab is punched out of said another flange and lies in the plane of said body in line with said leg portion, said tab having a hole therethrough for receiving a fastening device.

5. A bracket as set forth in claim 2 wherein the sum of the widths of said side flanges and said leg portion is equal to the length of said cross-bar.

6. A method of making a bracket adapted to hold two members at right angles, comprising the steps of:
   (a) providing a rectangular blank of sheet stock having two pairs of opposite edges,
   (b) cutting a pair of diagonal slits in said blank, each slit starting at opposite points on a first pair of opposite edges of said blank that are parallel to the center line thereof, and terminating at opposite points that are equally spaced from said center line;
   (c) folding said blank along spaced lines parallel to said center line that intersect the respective points at which said slits terminate to provide a first pair of flanges extending perpendicular to the plane of said blank, said last mentioned flanges adapted to engage and hold therebetween one of said two members;
   (d) folding said blank along a first line perpendicular to said center line that intersects the points at which said slits terminate to provide a second pair of aligned flanges that extend perpendicular to the plane of said blank in a direction opposite to said first pair of flanges; and
   (e) folding said blank along another line perpendicular to said center line but spaced from said first line to provide an end flange that is parallel to but spaced from said second pair of flanges and extends in the same direction as the latter, the other of said two members adapted to be engaged between and held by said second pair of flanges and said end flange.

References Cited by the Examiner

UNITED STATES PATENTS

| | | | |
|---|---|---|---|
| 1,230,181 | 6/1917 | Leonard | 189—36 X |
| 1,945,925 | 2/1934 | Stiefel | 20—94 |
| 2,084,758 | 6/1937 | Anderson | 20—95 |
| 2,865,588 | 12/1958 | McCartney | 248—300 |

FRANK L. ABBOTT, *Primary Examiner.*

EARL J. WITMER, *Examiner.*

R. A. STENZEL, *Assistant Examiner.*